United States Patent
Aoki et al.

(10) Patent No.: US 11,539,853 B2
(45) Date of Patent: Dec. 27, 2022

(54) DOCUMENT FEEDER AND IMAGE FORMING APPARATUS

(71) Applicant: SHARP KABUSHIKI KAISHA, Sakai (JP)

(72) Inventors: Reishi Aoki, Sakai (JP); Hisashi Yamanaka, Sakai (JP); Shohichi Fukutome, Sakai (JP); Mitsuharu Yoshimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/373,017

(22) Filed: Jul. 12, 2021

(65) Prior Publication Data

US 2022/0060599 A1    Feb. 24, 2022

(30) Foreign Application Priority Data

Aug. 18, 2020   (JP) .............................. JP2020-138256

(51) Int. Cl.
| | |
|---|---|
| H04N 1/12 | (2006.01) |
| H04N 1/00 | (2006.01) |
| H04N 1/028 | (2006.01) |

(52) U.S. Cl.
CPC ....... *H04N 1/1215* (2013.01); *H04N 1/00795* (2013.01); *H04N 1/0285* (2013.01)

(58) Field of Classification Search
CPC ............. H04N 1/00795; H04N 1/0285; H04N 1/1215; G03G 15/0875; G03G 15/0886; G03G 15/0194; G03G 15/1605; G03G 2215/0119; G03G 2221/18; G03G 15/0121; G03G 21/1619; G03G 15/0142; G03G 15/0855; G03G 15/0865; G03G 21/206; G03G 15/0877; G03G 21/1604; G03G 21/1676; G03G 2215/0692; G03G 15/04036; G03G 15/0868; G03G 15/0872; G03G 2221/163; G03G 21/1647; G03G 2215/0129; G03G 2215/0819; G03G 2221/1654; G03G 2221/1815; G03G 15/5058; G03G 15/0409; G03G 15/0435; G03G 15/0882; G03G 15/1615; G03G 15/50; G03G 2221/1678; G03G 15/60;

(Continued)

(56) References Cited

U.S. PATENT DOCUMENTS

| | | | |
|---|---|---|---|
| 6,247,645 B1 * | 6/2001 | Harris | G06K 7/10722 250/234 |
| 2002/0101625 A1 * | 8/2002 | Shouji | H04N 1/125 358/474 |

(Continued)

FOREIGN PATENT DOCUMENTS

| | | |
|---|---|---|
| JP | 2006-253914 A | 9/2006 |
| JP | 2013-058860 A | 3/2013 |

*Primary Examiner* — Negussie Worku
(74) *Attorney, Agent, or Firm* — ScienBiziP, P.C.

(57) ABSTRACT

An image reader used as a back surface reading unit includes LEDs, a first mirror, a second mirror, a third mirror, a lens, and a CCD inside a housing. The first mirror, which first reflects light reflected from the document, is positioned farther away from the document reading position than other reflecting mirrors (i.e. the second mirror and the third mirror) in an optical axis direction of the optical path connecting the document reading position and the first mirror.

22 Claims, 5 Drawing Sheets

(58) Field of Classification Search
CPC .. G03G 5/04; G03G 15/0891; G03G 15/2003; G03G 2215/0687; G03G 5/005; G03G 5/05; G03G 5/0525; G03G 5/10; G03G 5/102; G03G 5/142; G03G 15/00; G03G 15/1665; G03G 15/5004; G03G 15/605; G03G 15/70; G03G 15/0849; G03G 15/0896; G03G 15/2028; G03G 2215/0132; G03G 2215/0158; G03G 2215/0665; G03G 15/0131; G03G 15/2039; G03G 15/2053; G03G 15/55; G03G 15/602; G03G 15/6573; G03G 21/105; G03G 21/12; G03G 21/20; G03G 21/203; G03G 2215/00118; G03G 2215/0035; G03G 2215/0135; G03G 2215/0827; G03G 2215/20; G03G 15/043; G03G 15/205; G03G 15/234; G03G 15/502; G03G 15/5062; G03G 15/607; G03G 15/6558; G03G 15/751; G03G 21/1666; G03G 2221/1645; G03G 15/04; G03G 15/04072; G03G 15/0853; G03G 15/22; G03G 15/326; G03G 15/5008; G03G 15/5054; G03G 15/5083; G03G 15/5087; G03G 15/6511; G03G 15/6552; G03G 21/0035; G03G 2215/00042; G03G 2215/00109; G03G 2215/00126; G03G 2215/00316; G03G 2215/00341; G03G 2215/00569; G03G 2215/00616; G03G 2215/00822; G03G 2215/00831; G03G 2215/2032; G03G 2221/1636; G03G 2221/1672; G03G 5/043; G03G 5/147; G03G 9/09716; G03G 9/09725; G03G 15/0105; G03G 15/011; G03G 15/0189; G03G 15/0266; G03G 15/04045; G03G 15/06; G03G 15/08; G03G 15/0851; G03G 15/087; G03G 15/0893; G03G 15/0894; G03G 15/0898; G03G 15/09; G03G 15/0928; G03G 15/167; G03G 15/2021; G03G 15/2042; G03G 15/2064; G03G 15/232; G03G 15/235; G03G 15/5041; G03G 15/5045; G03G 15/652; G03G 15/6541; G03G 15/6544; G03G 15/6585; G03G 15/754; G03G 21/00; G03G 21/0094; G03G 21/10; G03G 21/1623; G03G 21/1633; G03G 21/1803; G03G 21/1842; G03G 21/1853; G03G 2215/00033; G03G 2215/00059; G03G 2215/00067; G03G 2215/00139; G03G 2215/00156; G03G 2215/00324; G03G 2215/00409; G03G 2215/00628; G03G 2215/00772; G03G 2215/00852; G03G 2215/0148; G03G 2215/0404; G03G 2215/0634; G03G 2215/067; G03G 2215/068; G03G 2215/0685; G03G 2215/0822; G03G 2215/0833; G03G 2215/085; G03G 2215/2045; G03G 2221/0005; G03G 5/00; G03G 5/0596; G03G 5/0601; G03G 5/0605; G03G 5/061473; G03G 5/06149; G03G 5/0666; G03G 5/0668; G03G 5/0672; G03G 15/04054; G03G 15/065; G03G 15/0812; G03G 15/0867; G03G 15/0889; G03G 15/16; G03G 15/1685; G03G 15/5037; G03G 15/505; G03G 15/65; G03G 15/6529; G03G 15/6538; G03G 15/6564; G03G 21/0011; G03G 21/0023; G03G 21/0064; G03G 21/0076; G03G 21/04; G03G 21/046; G03G 21/1609; G03G 21/1652; G03G 2215/00021; G03G 2215/00063; G03G 2215/00599; G03G 2215/00603; G03G 2215/00632; G03G 2215/00721; G03G 2215/00751; G03G 2215/00776; G03G 2215/0141; G03G 2215/021; G03G 2215/083; G03G 2215/0847; G03G 2215/0872; G03G 2215/0888; G03G 2215/1661; G03G 2221/1603; G03G 2221/1869; G03G 9/08; G03G 9/0806; G03G 9/0815; G03G 9/0819; G03G 9/0821; G03G 9/08755; G03G 9/08782; G03G 9/08791; G03G 9/08793; G03G 9/08795; G03G 9/08797; G03G 9/09708; G03G 9/0975; G03G 9/09775; G03G 9/09783
USPC ........................................................ 358/482
See application file for complete search history.

(56) References Cited

U.S. PATENT DOCUMENTS

| | | | |
|---|---|---|---|
| 2006/0203307 A1 | 9/2006 | Morimoto | |
| 2010/0157529 A1* | 6/2010 | Yoon | G03G 15/60 361/690 |
| 2011/0012134 A1* | 1/2011 | Takeuchi | H04N 1/02855 257/E31.103 |
| 2011/0181921 A1* | 7/2011 | Fukutome | G03G 15/50 358/474 |
| 2014/0226191 A1 | 8/2014 | Enomoto et al. | |
| 2016/0094749 A1* | 3/2016 | Sahara | H04N 1/0464 358/474 |
| 2019/0354035 A1* | 11/2019 | Shiraishi | G03G 15/0409 |
| 2020/0106911 A1* | 4/2020 | Shiraishi | H04N 1/02825 |
| 2021/0173323 A1* | 6/2021 | Matsuo | G03G 15/04036 |
| 2021/0377415 A1* | 12/2021 | Hasegawa | H04N 1/00795 |
| 2021/0377416 A1* | 12/2021 | Sekigawa | H04N 1/00795 |
| 2022/0060599 A1* | 2/2022 | Aoki | H04N 1/1215 |
| 2022/0131994 A1* | 4/2022 | Hozono | H04N 1/1061 |

* cited by examiner

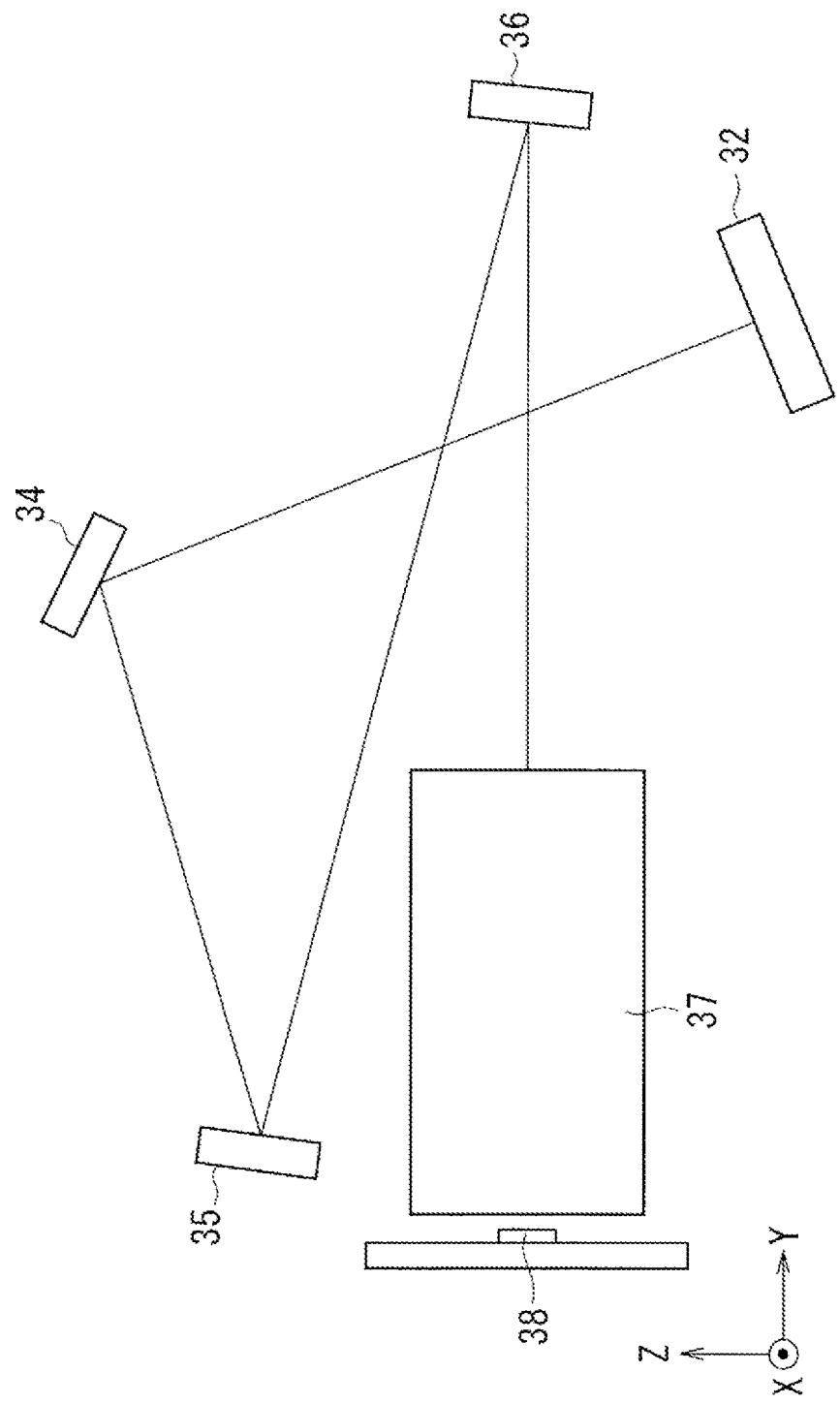

DOCUMENT FEEDER AND IMAGE FORMING APPARATUS

BACKGROUND OF THE INVENTION

Field of the Invention

The present invention relates to a document feeder including a back surface reading part to read the back surface of a document, and an image forming apparatus including the document feeder.

Description of the Background Art

There is provided a document reader in the image forming apparatus such as a composite machine. Furthermore, the document reader is usually used together with the document feeder. The document feeder separates documents one by one from a bundle of documents being set on a document tray by a pickup roller and feeds the document separate by a paper feed roller, and transports the separated document to the ejection tray allowing the separated document to pass through an image reading position. The document reader in the image forming apparatus reads a front surface of the document transported by the document feeder. On the other hand, there are some document feeders providing with a back surface reading part for reading the back surface of the transported document (see Japanese Patent Laid-Open Publication No. 2013-58860, and Japanese Patent Laid-Open Publication No. 2006-253914).

The back surface reading part is provided in the document feeder as a miniaturized image reader which includes a small optical system including a lens and a plurality of reflecting mirrors arranged between a CCD (photoelectric transducer) as an image reading means and a document reading position (i.e. a portion of a document contact glass in which the front surface of the document and the document contact glass contact with each other). The plurality of reflecting mirrors are provided in order to obtain a sufficient optical path length inside the back surface reading part with a limited volume. Namely, the back surface reading part is configured to irradiate light emitted from a light source toward the document reading position, cause the light reflected from the document reading position to reflect with the plurality of reflecting mirrors, and read the light incident on the CCD through the lens.

In such a back surface reading part, when dust adheres to a reflective surface of the reflecting mirror, read images often had dust streaks in the sub-reading direction. This is because the conventional back surface reading part includes a first mirror (i.e. the reflecting mirror that first reflects the light reflected at the document reading position) which is placed in the vicinity of the document reading position. In this case, because the reflective surface of the first mirror comes close to a focus position of the lens (i.e. the document reading position), if dust adheres to the reflective surface of the first mirror, the read images are likely to be affected by the dust.

The present invention has been made in light of the above described problem, and an object of the present invention is to provide a document feeder including a back surface reading part which can reduce the influence of dust adhering to the reflecting mirror of the back surface reading part, and an image forming apparatus including the same.

SUMMARY OF THE INVENTION

In order to solve the above described problem, in the first aspect of the present invention, there is provided a document feeder including: a transport path to transport a document; and an image reader positioned along the transport path to read the document being transported, the image reader includes in a housing a light source, a plurality of reflecting mirrors, a lens, and a photoelectric transducer, as well as reads an image by reflecting light reflected at a document reading position of the document and directing the light to be incident on the photoelectric transducer with the plurality of reflecting mirrors, wherein when a first mirror first reflects the light reflected from the document among the plurality of reflecting mirrors, the first mirror is positioned farther away from the document reading position than other reflecting mirrors in an optical axis direction of an optical path connecting the document reading position and the first mirror.

According to the document feeder provided with the above descried configuration, by positioning the first mirror farther away from the document reading position than other reflecting mirrors in the optical axis direction of the optical path connecting the document reading position and the first mirror, it is possible to place the first mirror as far as possible away from the document reading position inside the housing with a limited volume. As a result, the influence of dust adhering to the first mirror can be reduced, and thus the generation of dust streaks in the read images can be suppressed.

In order to solve the above described problem, in the second aspect of the present invention, there is provided a document feeder including: a transport path to transport a document; and an image reader positioned along the transport path to read the document being transported, the image reader includes in a housing a light source, a plurality of reflecting mirrors, a lens, and a photoelectric transducer, as well as reads an image by reflecting light reflected at a document reading position of the document and directing the light to be incident on the photoelectric transducer with the plurality of reflecting mirrors, wherein when a first mirror first reflects the light reflected from the document among the plurality of reflecting mirrors, the first mirror is positioned opposite to the document reading position with respect to an optical path connecting a reflecting mirror that lastly reflects the light reflected from the document and the photoelectric transducer.

According to the document feeder provided with the above descried configuration, by positioning the first mirror opposite to the document reading position with respect to an optical path connecting a reflecting mirror that lastly reflects the light reflected from the document and the photoelectric transducer, it is possible to place the first mirror as far as possible away from the document reading position inside the housing with a limited volume. As a result, the influence of dust adhering to the first mirror can be reduced, and thus the generation of dust streaks in the read images can be suppressed.

Furthermore, the above described document feeder may be configured such that the light reflected from the document travels along an optical path in which the light is sequentially reflected with three reflecting mirrors consisting of the first mirror, a second mirror, and a third mirror in this order, and is incident on the photoelectric transducer through the lens, and an optical path connecting the document reading position and the first mirror intersects both an optical path connecting the second mirror and the third mirror, and an optical path connecting the third mirror and the photoelectric transducer, as well as an optical path connecting the first mirror and the second mirror intersects an optical path connecting the third mirror and the photoelectric transducer.

According to the document feeder provided with the above descried configuration, by arranging the first mirror, the second mirror, and the third mirror so that a plurality of optical paths intersect each other, it is possible to efficiently secure an optical path length inside the housing with a limited volume.

Furthermore, the above described document feeder may be configured such that the first mirror is placed in contact with a protrusion provided on an inner wall surface of the housing.

According to the document feeder provided with the above descried configuration, it is possible to make a distance between the document reading position and the first mirror maximum inside the housing. In addition, this configuration can prevent dust from adhering to the surface of the first mirror.

Furthermore, the above described document feeder may be configured such that the first mirror is positioned farther away from the document reading position than the lens in the optical axis direction of the optical path connecting the document reading position and the first mirror.

Furthermore, the above described document feeder may be configured such that the light reflected from the document travels along an optical path in which the light is sequentially reflected with three reflecting mirrors consisting of the first mirror, a second mirror, and a third mirror in this order, and is incident on the photoelectric transducer through the lens, and the second mirror, the third mirror, and the first mirror are positioned to be apart in this order from the document reading position in the optical axis direction of the optical path connecting the document reading position and the first mirror.

Furthermore, the above described document feeder may be configured such that the light reflected from the document travels along an optical path in which the light is sequentially reflected with three reflecting mirrors consisting of the first mirror, the second mirror, and the third mirror in this order, and is incident on the photoelectric transducer through the lens, and the second mirror is placed below the lens and positioned within a range of a longitudinal dimension of the lens.

Furthermore, the above described document feeder may be configured such that
the light reflected from the document travels along an optical path in which the light is sequentially reflected with three reflecting mirrors consisting of the first mirror, a second mirror, and a third mirror in this order, and is incident on the photoelectric transducer through the lens, and the third mirror, the second mirror, and the first mirror are positioned to be apart in this order from the document reading position in the optical axis direction of the optical path connecting the document reading position and the first mirror.

Furthermore, the above described document feeder may be configured such that the light reflected from the document travels along an optical path in which the light is sequentially reflected with three reflecting mirrors consisting of the first mirror, the second mirror, and the third mirror in this order, and is incident on the photoelectric transducer through the lens, and the second mirror is placed above the lens and positioned within a range of a longitudinal dimension of the lens.

Moreover, in order to solve the above-described issues, according to the third aspect of the present invention, there is provided an image forming apparatus including the above-described document feeder.

According to the document feeder and the image forming apparatus of the present invention, as the first mirror can be arranged as far as possible away from the document reading position inside the housing with a limited volume, it is possible to achieve such an effect that the influence of dust adhering to the first mirror is reduced and thus the generation of dust streaks in the read images is suppressed.

BRIEF DESCRIPTION OF THE DRAWINGS

FIG. 5 is a schematic diagram illustrating an arrangement of main parts in the image reader according to the second embodiment.

DESCRIPTION OF THE PREFERRED EMBODIMENTS

First Embodiment

Figure 1:
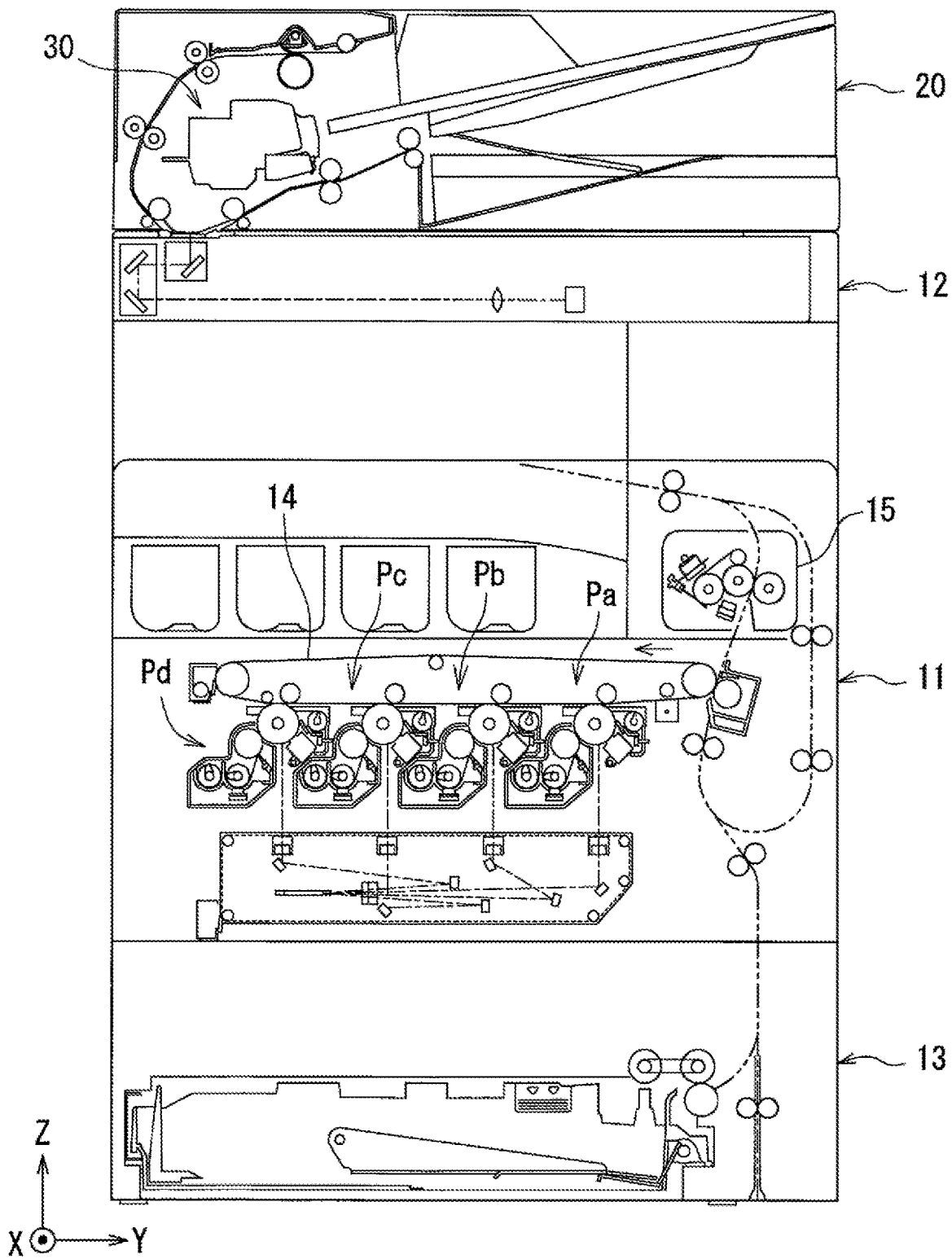
FIG. 1 is a schematic diagram illustrating an exemplary configuration of an image forming apparatus according to the present invention.

Now some embodiments of the present invention will be described below in detail with reference to the drawings. FIG. 1 is a schematic diagram illustrating an exemplary configuration of an image forming apparatus 10 according to the present invention. The image forming apparatus 10 shown in FIG. 1 is a color image forming apparatus having a plurality of process units, however, not limited thereto, the present invention can be applied to a monochrome image forming apparatus having a single process unit.

As shown in FIG. 1, the image forming apparatus 10 is configured to include a main body 11, a document reader 12, a document feeder 20, and a paper feeding device 13. The main body 11 accommodates an image forming part for printing an image on a recording paper. The document reader 12 is mounted on the main body 11 and reads a document when copying the document. In an automatic reading mode, the document feeder 20 sequentially transports documents placed on a document set tray one by one toward a document placing table of the document reader 12. Furthermore, the document feeder 20 accommodates an image reader 30 which can be used as a back surface reading unit for reading a back surface of the transported document. Namely, when the document reader 12 reads a front surface (or referred to as a first surface) of the document transported by the document feeder 20, the image reader 30 can read the back surface (or referred to as a second surface) of the document at the same time. The paper feeding device 13 stocks the recording papers and feeds a sheet thereof to the main body 11 when forming an image.

The image forming apparatus 10 can handle image data corresponding to a color image using black (K), cyan (C), magenta (M), and yellow (Y), or image data corresponding to a monochrome image using a single color (e.g. black). Therefore, the image forming apparatus 10 includes four process units Pa, Pb, Pc, and Pd which are associated with black, cyan, magenta, and yellow, respectively. Each of process units Pa, Pb, Pc, and Pd forms toner images according to the image data using an electrophotographic technology.

Each of toner images formed by each of process units Pa, Pb, Pc, and Pd is sequentially transferred and superimposed on an intermediate transfer belt 14. As a result, color toner images can be formed on the intermediate transfer belt 14. Then, the color toner images formed on the intermediate transfer belt 14 are transferred onto the recording paper, and a fixing device 15 fixes the color toner images on the recording paper by heating and pressurizing the recording paper.

Figure 2:
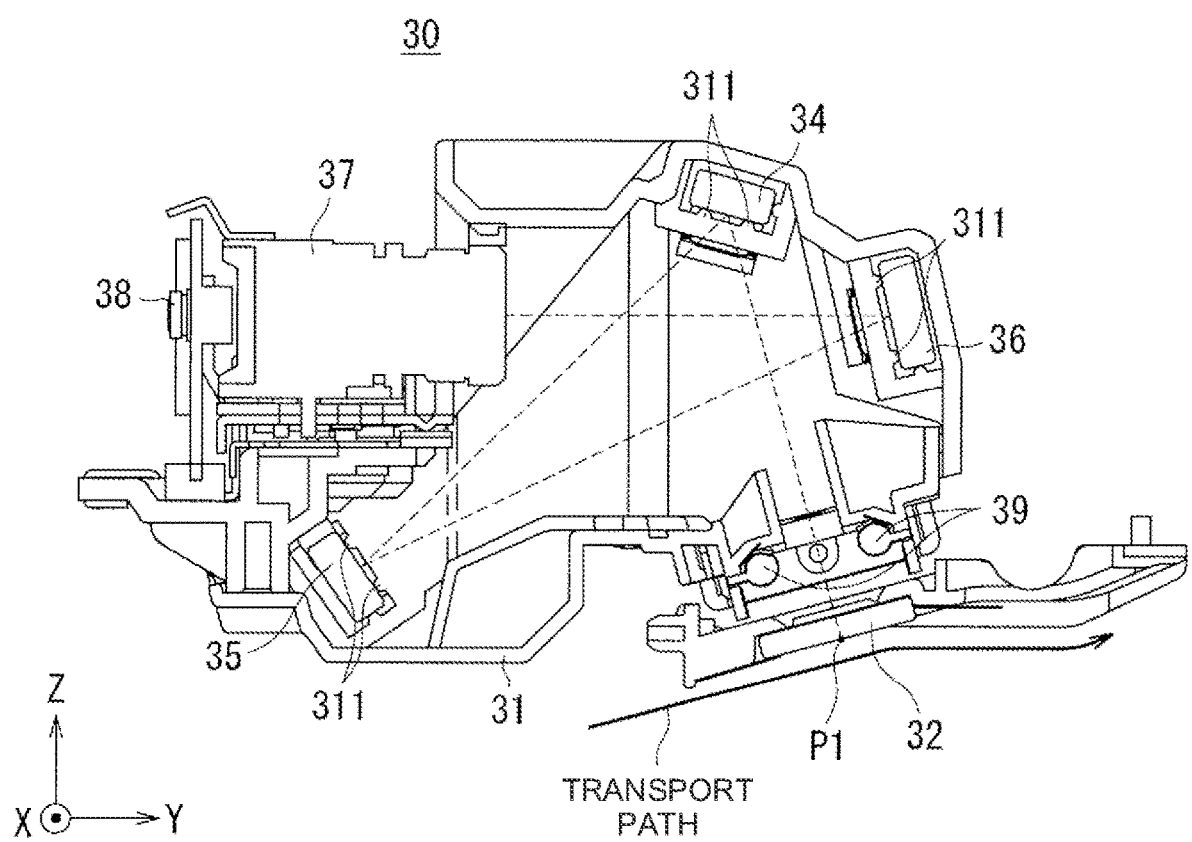
FIG. 2 is a cross-sectional view of an image reader provided in a document feeder according to an embodiment of the present invention.

The characteristic configuration of the document feeder 20 according to the present embodiment will be described below. As described above, the document feeder 20 is provided with the image reader 30. FIG. 2 is a cross-sectional view of the image reader 30 provided in the document feeder 20. Hereinafter, in the present embodiment, a notation of directions is defined in such a way that an X-direction designates a width direction of the document transported by the document feeder 20 (i.e. a front-rear direction of the document feeder 20), a Y-direction designates a left-right direction of the document feeder 20, and a Z-direction designates a height direction of the document feeder 20, and these directions are illustrated in the respective drawings.

As shown in FIG. 2, the image reader 30 is positioned above a predetermined transport path in the document feeder 20. Preferably, the image reader 30 is positioned above a transport path region between a document reading position in the document reader 12 and a document ejection tray. In the transport path region, the document is transported with the front surface thereof (i.e. the first surface) facing downward. Therefore, the image reader 30 positioned above the transport path region can read the back surface (i.e. the second surface) of the document.

The image reader 30 is configured as a unit in which a housing 31 accommodates main parts for reading the document. The main parts of the image reader 30 include a document contact glass 32, LEDs 33 (i.e. light sources illustrated in FIG. 3), a first mirror 34, a second mirror 35, a third mirror 36, a lens 37, a CCD 38 (as an example of a photoelectric transducer), and light guide members 39. The LEDs 33, the first mirror 34, the second mirror 35, the third mirror 36, the lens 37, the CCD 38, and the light guide members 39 are accommodated and arranged inside the housing 31.

The document contact glass 32 is attached to the housing 31 to cover an opening for reading the document, which is provided on the housing 31, and face the transport path region. As the document is transported through the transfer path region being in contact with the surface of the document contact glass 32, it allows for well-focused read images. Namely, a portion of the document transported through the transport path region, which is in contact with the surface of the document contact glass 32, becomes a document reading position P1.

The LEDs 33 irradiate the document reading position P1 with light through the document contact glass 32. Since it is necessary to irradiate the entire document reading position P1 with light expanded in the document width direction, the LEDs 33 are used in combination with the light guide members 39. In the present embodiment, each of the light guide members 39 is provided as a rod-shaped member whose longitudinal direction corresponds to the width direction of the document, and the light of LEDs 33 is incident on the light guide members 39 from both longitudinal-direction ends of the light guide members 39. Furthermore, in the present embodiment, there are provided two light guide members 39 and four LEDs 33 corresponding to the light guide members 39 (i.e. two LEDs 33 for every light guide members 39).

The light reflected at the document reading position P1 of the document (i.e. light reflected from the document) travels along an optical path which is formed by the first mirror 34, the second mirror 35, and the third mirror 36, being sequentially reflected with those mirrors, passes through the lens 37, and is finally incident on the CCD 38. Namely, the image reader 30 can secure a necessary optical path length inside the housing 31 with a limited volume by reflecting the light with the first mirror 34, the second mirror 35, and the third mirror 36.

Figure 3:
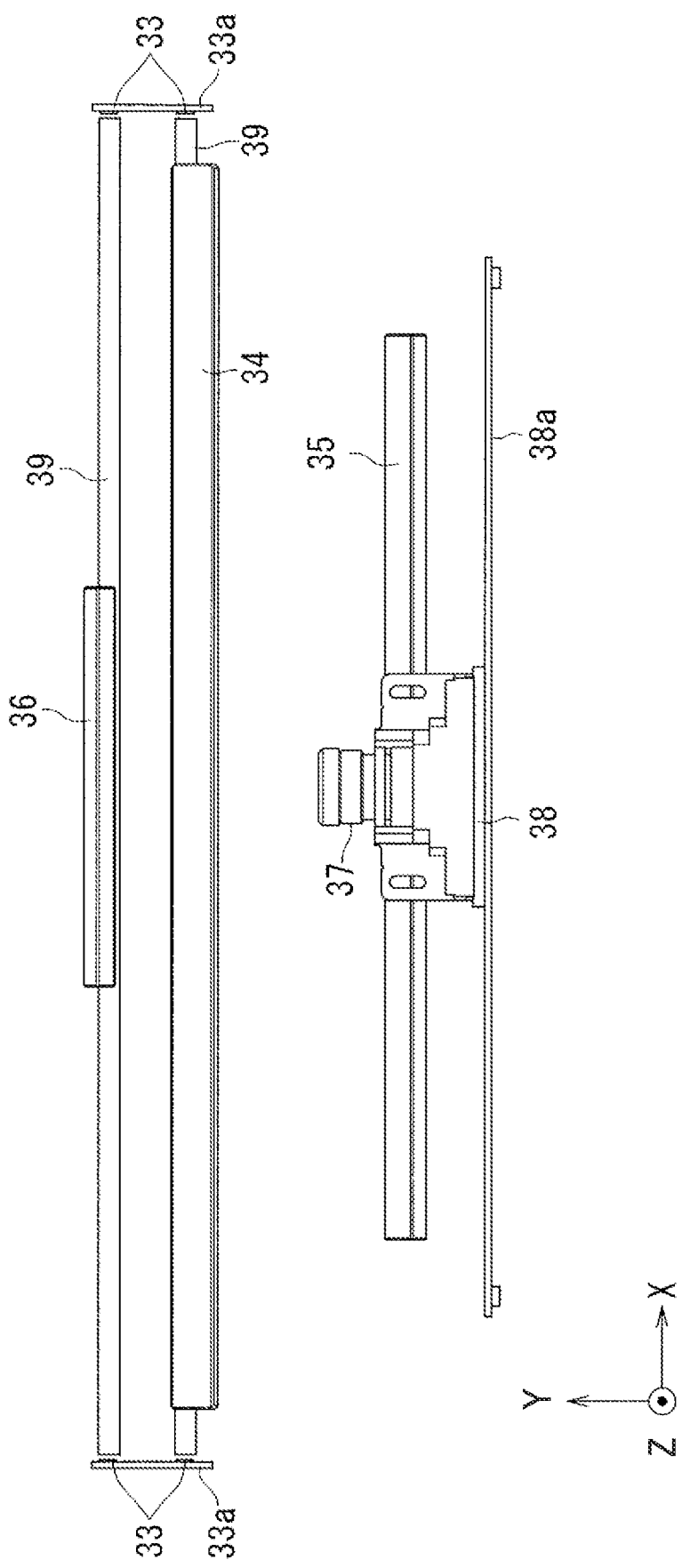
FIG. 3 is a diagram illustrating an arrangement of main parts inside the back surface reading part as a bird's eye view.

FIG. 3 shows an arrangement of the main parts (for example, LEDs 33, the first mirror 34, the second mirror 35, the third mirror 36, the lens 37, the CCD 38, and the light guide members 39) inside the image reader 30 as a bird's eye view of the image reader 30. As shown in FIG. 3, the first mirror 34, the second mirror 35, and the third mirror 36 are configured so that the smaller the distance from the document reading position P1 to the mirror along the optical path is, the longer the dimension of the mirror in the document width direction is. Namely, in the document width direction, the first mirror 34, the second mirror 35, and the third mirror 36 have the longest dimension, the second longest dimension, and the shortest dimension, respectively. Preferably, the dimension in the document width direction of the light guide members 39 is the same as or slightly larger than that of the first mirror 34. Furthermore, the LEDs 33 are attached to an LED substrate 33a, and the CCD 38 is attached to a CCD substrate 38a.

The image reader 30 according to the present embodiment intends to reduce an influence of dust adhering to the first mirror 34 by devising the arrangement of the first mirror 34, the second mirror 35, and the third mirror 36. Namely, since the first mirror 34 is a reflecting mirror that first reflects the light reflected at the document reading position P1, a distance from the first mirror 34 to the focus position of the lens 37 (i.e. the document reading position P1) is smaller than that from the second mirror 35 or the third mirror 36 thereto, and thus if dust adheres to a reflective surface of the first mirror 34, defects due to dust likely appear in the read images. Therefore, in the image reader 30, it is important to reduce the influence of dust adhering to the first mirror 34.

In the image reader 30, the first mirror 34 is positioned farther away from the document reading position P1 than the conventional one. Such an arrangement makes it possible to reduce the influence of dust adhering to the first mirror 34, because it becomes difficult to focus on the reflective surface of the first mirror 34. Namely, the defects due to dust less likely appear in the images read by the image reader 30.

Specifically, there is a method of positioning the first mirror 34 based on some theories as described below, for example.

On the basis of the first theory, the method includes positioning the first mirror 34 farther away from the document reading position P1 than other reflecting mirrors (i.e. the second mirror 35 and the third mirror 36) in an optical axis direction of the optical path connecting the document reading position P1 and the first mirror 34.

On the basis of the second theory, the method includes positioning the first mirror 34 opposite to the document reading position P1 with respect to the optical path connecting the third mirror 36 (i.e. the reflecting mirror that lastly reflects the light reflected from the document to direct the light incident on the CCD 38) and the CCD 38.

By positioning the first mirror 34 based on these theories, it is possible to position the first mirror 34 as far as possible away from the document reading position P1 inside the housing 31 with a limited volume. As a result, the influence of dust adhering to the first mirror 34 can be reduced, and thus the generation of dust streaks in the read images can be suppressed. Furthermore, in both the first theory and the second theory, it is preferable to position the first mirror 34 farther away from the document reading position P1 than the lens 37 in the optical axis direction of the optical path connecting the document reading position P1 and the first mirror 34.

Moreover, as shown in FIG. 2, the image reader 30 according to the first embodiment is provided with the second mirror 35 which is positioned below the lens 37 and placed within a range of a longitudinal dimension of the lens 37. In this example, the second mirror 35, the third mirror 36, and the first mirror 34 are positioned to be apart in this order from the document reading position P1 in the optical axis direction of the optical path connecting the document reading position P1 and the first mirror 34.

Furthermore, it is preferable that an optical path connecting the document reading position P1 and the first mirror 34 intersects both an optical path connecting the second mirror 35 and the third mirror 36 and an optical path connecting the third mirror 36 and the CCD 38, as well as an optical path connecting the first mirror 34 and the second mirror 35 intersects the optical path connecting the third mirror 36 and the CCD 38. In this way, by arranging the first mirror 34, the second mirror 35, and the third mirror 36 so that the plurality of optical paths intersect each other, it is possible to efficiently secure the optical path length inside the housing 31 with a limited volume.

In FIG. 2, the first mirror 34, the second mirror 35, and the third mirror 36 are attached by bringing the reflective surfaces of each mirrors into contact with protrusions 311 formed inside the housing 31 and pressing from a side of an inner wall surface toward an inside of the housing 31 portions at both ends of back surfaces (i.e. surfaces opposite to the reflective surfaces) of each mirrors with leaf springs (not shown). In this example, the first mirror 34, the second mirror 35, and the third mirror 36 are arranged to make no contact with the inner wall surface of the housing 31. Here, the inner wall surface of the housing 31 refers to an inner plate surface of the outermost wall of the housing 31.

Figure 4:
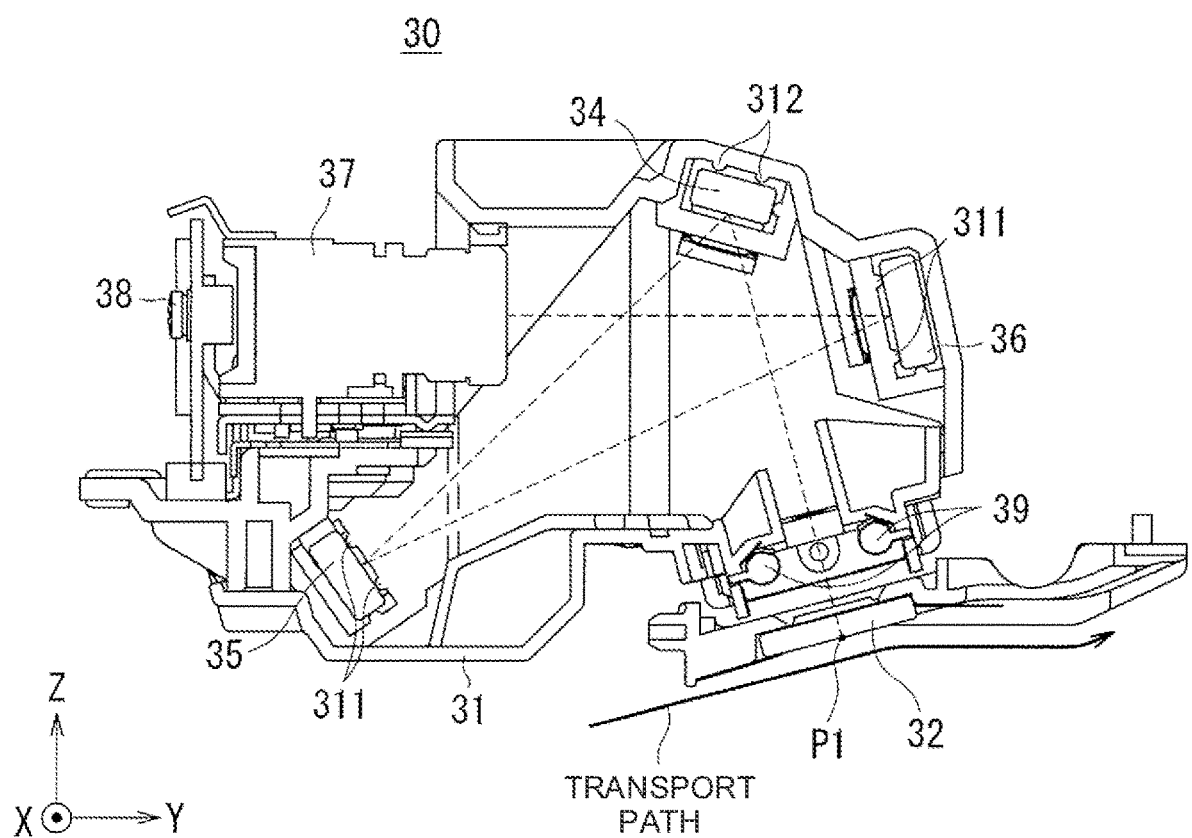
FIG. 4 is a cross-sectional view illustrating an alternative example of the image reader.

However, the first mirror 34 may be placed in contact with the inner wall surface of the housing 31. In this example, as shown in FIG. 4, the first mirror 34 is attached by bringing the back surface of the first mirror 34 into contact with protrusions 312 formed on the inner wall surface of the housing 31 and pressing from an inside of the housing 31 toward a side of an inner wall surface portions at both ends of a back surface of the refractive surface of the first mirror 34 with leaf springs (not shown). In this way, by positioning the first mirror 34 in contact with the inner wall surface of the housing 31, it is possible to make the distance between the document reading position P1 and the first mirror 34 maximum inside the housing 31.

Furthermore, the image reader 30 is arranged above the transport path in the document feeder 20, and read a back surface of the document being transported. Namely, since the document reading position P1 is located underside of the image reader 30, if the first mirror 34 is positioned in contact with the inner wall surface of the housing 31, it is possible to place the first mirror 34 at the highest position inside the housing 31. Since dust that has invaded the housing 31 of the image reader 30 is likely to accumulate downward due to gravity and unlikely to accumulate upward, this configuration makes it possible to prevent the refractive surface of the first mirror 34 from dust accumulating thereon.

Furthermore, by positioning the first mirror 34 in contact with the inner wall surface of the housing 31, it is also possible to prevent dust from accumulating on the back surface of the first mirror 34, as well as falling and sticking to the refractive surface of the first mirror 34.

Second Embodiment

Now the second embodiment is described as an alternative example of the first embodiment, in which an arrangement of some of the main parts (e.g. the document contact glass 32, the first mirror 34, the second mirror 35, the third mirror 36, the lens 37 and the CCD 38) in the image reader 30 is different from that of the first embodiment. FIG. 5 is a schematic diagram illustrating an arrangement of the main parts of the image reader 30 according to the second embodiment.

Namely, as shown in FIG. 5, the second mirror 35 may be positioned above the lens 37 and placed within a range of a longitudinal dimension of the lens 37. In this example, the third mirror 36, the second mirror 35, and the first mirror 34 are positioned to be apart in this order from the document reading position P1 in the optical axis direction of the optical path connecting the document reading position P1 and the first mirror 34.

It should be noted that the embodiments disclosed herein are illustrated as only examples in all respects and do not serve as a basis for a limited interpretation. Therefore, the technical scope of the present invention is not interpreted based on only the above-described embodiments but defined based on a statement in the claims. Furthermore, any changes and modifications within the meaning and range equivalent to the claims fall within the scope of the invention.

What is claimed is:

1. A document feeder comprising: a transport path to transport a document; and an image reader positioned along the transport path to read the document being transported, wherein the image reader includes in a housing a light source, a plurality of reflecting mirrors, a lens, and a photoelectric transducer, as well as reads an image by reflecting light reflected at a document reading position of the document and directing the light to be incident on the photoelectric transducer with the plurality of reflecting mirrors, wherein when a first mirror first reflects the light reflected from the document among the plurality of reflecting mirrors, the first mirror is positioned farther away from the document reading position than other reflecting mirrors in an optical axis direction of an optical path connecting the document reading position and the first mirror, wherein the light reflected from the document travels along an optical path in which the light is sequentially reflected with three reflecting mirrors consisting of the first mirror, a second mirror, and a third mirror in this order, and is incident on the photoelectric transducer through the lens, and an optical path connecting the document reading position and the first mirror intersects both an optical path connecting the second mirror and the third mirror, and an optical path connecting the third mirror and the photoelectric transducer, as well as an optical path connecting the first mirror and the second mirror intersects an optical path connecting the third mirror and the photoelectric transducer.

2. The document feeder according to claim 1, wherein the first mirror is placed in contact with a protrusion provided on an inner wall surface of the housing.

3. The document feeder according to claim 1, wherein the first mirror is positioned farther away from the document reading position than the lens in the optical axis direction of the optical path connecting the document reading position and the first mirror.

4. The document feeder according to claim 1, wherein
the second mirror, the third mirror, and the first mirror are positioned to be apart in this order from the document reading position in the optical axis direction of the optical path connecting the document reading position and the first mirror.

5. The document feeder according to claim 4, wherein
the second mirror is placed below the lens and positioned within a range of a longitudinal dimension of the lens.

6. An image forming apparatus comprising the document feeder according to claim 1.

7. A document feeder comprising: a transport path to transport a document; and an image reader positioned along the transport path to read the document being transported, wherein
the image reader includes in a housing a light source, a plurality of reflecting mirrors, a lens, and a photoelectric transducer, as well as reads an image by reflecting light reflected at a document reading position of the document and directing the light to be incident on the photoelectric transducer with the plurality of reflecting mirrors, wherein
when a first mirror first reflects the light reflected from the document among the plurality of reflecting mirrors,
the first mirror is positioned opposite to the document reading position with respect to an optical path connecting a reflecting mirror that lastly reflects the light reflected from the document and the photoelectric transducer, wherein
the light reflected from the document travels along an optical path in which the light is sequentially reflected with three reflecting mirrors consisting of the first mirror, a second mirror, and a third mirror in this order, and is incident on the photoelectric transducer through the lens, and
an optical path connecting the document reading position and the first mirror intersects both an optical path connecting the second mirror and the third mirror, and an optical path connecting the third mirror and the photoelectric transducer, as well as an optical path connecting the first mirror and the second mirror intersects an optical path connecting the third mirror and the photoelectric transducer.

8. The document feeder according to claim 7, wherein the first mirror is placed in contact with a protrusion provided on an inner wall surface of the housing.

9. The document feeder according to claim 7, wherein the first mirror is positioned farther away from the document reading position than the lens in the optical axis direction of the optical path connecting the document reading position and the first mirror.

10. The document feeder according to claim 7, wherein
the second mirror, the third mirror, and the first mirror are positioned to be apart in this order from the document reading position in the optical axis direction of the optical path connecting the document reading position and the first mirror.

11. The document feeder according to claim 10, wherein
the second mirror is placed below the lens and positioned within a range of a longitudinal dimension of the lens.

12. An image forming apparatus comprising the document feeder according to claim 7.

13. A document feeder comprising: a transport path to transport a document; and an image reader positioned along the transport path to read the document being transported, wherein
the image reader includes in a housing a light source, a plurality of reflecting mirrors, a lens, and a photoelectric transducer, as well as reads an image by reflecting light reflected at a document reading position of the document and directing the light to be incident on the photoelectric transducer with the plurality of reflecting mirrors, wherein
when a first mirror first reflects the light reflected from the document among the plurality of reflecting mirrors,
the first mirror is positioned farther away from the document reading position than other reflecting mirrors in an optical axis direction of an optical path connecting the document reading position and the first mirror, and wherein
the light reflected from the document travels along an optical path in which the light is sequentially reflected with three reflecting mirrors consisting of the first mirror, a second mirror, and a third mirror in this order, and is incident on the photoelectric transducer through the lens, and
the second mirror, the third mirror, and the first mirror are positioned to be apart in this order from the document reading position in the optical axis direction of the optical path connecting the document reading position and the first mirror.

14. The document feeder according to claim 13, wherein the first mirror is placed in contact with a protrusion provided on an inner wall surface of the housing.

15. The document feeder according to claim 13, wherein the first mirror is positioned farther away from the document reading position than the lens in the optical axis direction of the optical path connecting the document reading position and the first mirror.

16. The document feeder according to claim 13, wherein the second mirror is placed below the lens and positioned within a range of a longitudinal dimension of the lens.

17. An image forming apparatus comprising the document feeder according to claim 13.

18. A document feeder comprising: a transport path to transport a document; and an image reader positioned along the transport path to read the document being transported, wherein
the image reader includes in a housing a light source, a plurality of reflecting mirrors, a lens, and a photoelectric transducer, as well as reads an image by reflecting light reflected at a document reading position of the document and directing the light to be incident on the photoelectric transducer with the plurality of reflecting mirrors, wherein when a first mirror first reflects the light reflected from the document among the plurality of reflecting mirrors, the first mirror is positioned opposite to the document reading position with respect to an optical path connecting a reflecting mirror that lastly reflects the light reflected from the document and the photoelectric transducer, and wherein the light reflected from the document travels along an optical path in which the light is sequentially reflected with three reflecting mirrors consisting of the first mirror, a second mirror, and a third mirror in this order, and is incident on the photoelectric transducer through the lens, and the second mirror, the third mirror, and the first mirror are positioned to be apart in this order from the document reading position in the optical axis direction of the optical path connecting the document reading position and the first mirror.

19. The document feeder according to claim 18, wherein the first mirror is placed in contact with a protrusion provided on an inner wall surface of the housing.

20. The document feeder according to claim 18, wherein the first mirror is positioned farther away from the document reading position than the lens in the optical axis direction of the optical path connecting the document reading position and the first mirror.

21. The document feeder according to claim 18, wherein the second mirror is placed below the lens and positioned within a range of a longitudinal dimension of the lens.

22. An image forming apparatus comprising the document feeder according to claim 18.

* * * * *